No. 649,746. Patented May 15, 1900.
J. E. O'NEILL.
BICYCLE ATTACHMENT.
(Application filed Mar. 1, 1900.)
(No Model.)
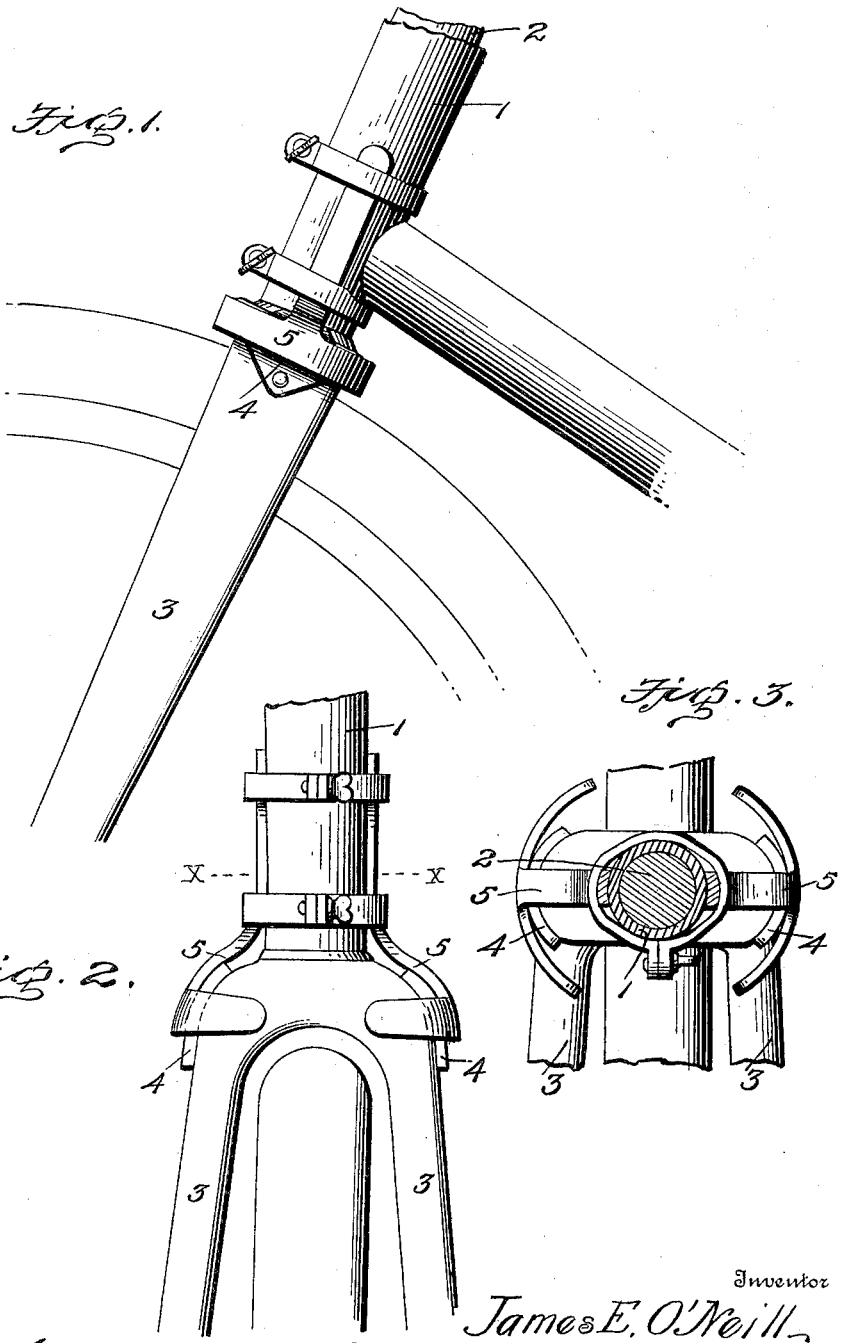
Witnesses
Inventor
James E. O'Neill
by H. B. Willson & Co.
Attorneys
THE NORRIS PETERS CO., PHOTO-LITHO., WASHINGTON, D. C.

UNITED STATES PATENT OFFICE.

JAMES E. O'NEILL, OF WAUPACA, WISCONSIN.

BICYCLE ATTACHMENT.

SPECIFICATION forming part of Letters Patent No. 649,746, dated May 15, 1900.

Application filed March 1, 1900. Serial No. 6,951. (No model.)

*To all whom it may concern:*

Be it known that I, JAMES E. O'NEILL, a citizen of the United States, residing at Waupaca, in the county of Waupaca and State of Wisconsin, have invented certain new and useful Improvements in Bicycle Attachments; and I do declare the following to be a full, clear, and exact description of the invention, such as will enable others skilled in the art to which it appertains to make and use the same.

The invention relates to bicycle attachments. In supporting a bicycle against a wall or other upright support after the rider has dismounted it is necessary to parallel the front or steering wheel with the frame and the rear wheel. When leaning against the support with the steering-wheel in this position, the handle-bars project laterally and are frequently brushed against by pedestrians, which causes the steering-wheel to be swung around or turned at an angle to the length of the frame, thus permitting the bicycle to roll out from against the support and fall to the ground.

It is the object of the present invention to provide a simple, durable, and comparatively inexpensive and easily-applied attachment for a bicycle whereby when leaning against the support its steering-wheel will be retained in the position in which it is set, and thereby prevent the bicycle from being accidentally tipped over upon the ground by persons brushing by the same or sudden gusts of wind.

With this object in view the invention consists, broadly, in the combination, with magnets, of armatures, one movable with respect to the other, said armatures being arranged within the magnetic field and being controlled thereby.

In the accompanying drawings, which represent one and the preferred embodiment of my invention, Figure 1 is a side view of a portion of a bicycle-frame and the steering-wheel, illustrating the application of my invention. Fig. 2 is a front view. Fig. 3 is a sectional view on line $x\,x$ of Fig. 2.

In the drawings the same reference characters indicate the same parts of the invention.

1 denotes the steering-head tube or fixed frame of a bicycle, and 2 the steering-frame, which comprises the steering-head which projects upward through said tube and the front fork 3, which is fixed to the lower end of said head. These parts may be of any well-known or approved construction.

4 4 denote magnets which are bolted or otherwise secured to the upper end of the forks, and 5 5 denote armatures which are clamped or otherwise connected to the steering-head tube. The arrangement of these parts may be reversed, if desired—that is to say, the magnets may be secured to the steering-head tube and the armatures secured to the upper end of the fork. When a bicycle is leaning against the wall or other support, with the steering-wheel parallel with the rear wheel, the steering-wheel will be held in this position by the influence of the magnets, which attract the armatures thereto and hold them. While the magnetic force is sufficient to prevent the accidental twisting or turning of the steering-wheel at an angle to the rear wheel, it is not so great as to interfere with the steering of the bicycle by its rider.

From the foregoing description, taken in connection with the accompanying drawings, the construction, operation, and advantages of my improved attachment for bicycles will be readily apparent without requiring an extended explanation. It will be seen that the device is simple of construction, that said construction permits of its manufacture at small cost, and that it is exceedingly well adapted for the purpose for which it is designed.

Various changes in the form, proportion, and the minor details of construction may be resorted to without departing from the principle or sacrificing any of the advantages of this invention.

Having thus described the invention, what is claimed, and desired to be secured by Letters Patent, is—

The combination with a fixed part of a bicycle-frame and a movable steering part of a bicycle-frame, of a magnet and an armature, the one carried by said fixed part of the bicycle-frame and the other by the movable or steering part of the bicycle-frame, the armature being located in the field of the magnet.

In testimony whereof I have hereunto set my hand in presence of two subscribing witnesses.

JAMES E. O'NEILL.

Witnesses:
MICHAEL HAFFEY,
CHAS. J. ELLIS.